United States Patent [19]

Krogsrud

[11] 3,976,727

[45] Aug. 24, 1976

[54] VENTURI GAS SCRUBBERS FOR SMELTING FURNACES

[75] Inventor: Harald Krogsrud, Gjettum, Norway

[73] Assignee: Elkem-Spigerverket, Oslo, Norway

[22] Filed: Feb. 6, 1975

[21] Appl. No.: 547,477

Related U.S. Application Data

[63] Continuation of Ser. No. 448,723, March 6, 1974, abandoned, which is a continuation-in-part of Ser. No. 216,109, Jan. 7, 1972, abandoned.

[52] U.S. Cl............................. 261/116; 261/DIG. 54
[51] Int. Cl.²........................................... B01F 3/04
[58] Field of Search......... 261/DIG. 54, 116, DIG. 9

[56] References Cited
UNITED STATES PATENTS

| | | | |
|---|---|---|---|
| 723,531 | 3/1903 | Jackson | 261/DIG. 54 |
| 2,487,176 | 11/1949 | Pitt et al. | 261/DIG. 54 |
| 2,604,185 | 7/1952 | Johnstone et al. | 261/DIG. 9 |
| 2,964,304 | 12/1960 | Rice | 261/DIG. 54 |
| 2,992,777 | 7/1961 | Kinney et al. | 239/116 |
| 3,009,687 | 11/1961 | Hendriks | 261/DIG. 54 |
| 3,014,705 | 12/1961 | Colucci | 261/DIG. 54 |
| 3,222,136 | 12/1965 | Hess et al. | 261/DIG. 54 |
| 3,367,402 | 2/1968 | Cross, Jr. et al. | 261/DIG. 54 |
| 3,378,240 | 4/1968 | Kinney | 261/DIG. 54 |
| 3,471,138 | 10/1969 | Lohner et al. | 261/DIG. 9 |
| 3,706,538 | 12/1972 | Chew | 261/DIG. 54 |

*Primary Examiner*—Tim R. Miles
*Attorney, Agent, or Firm*—Eyre, Mann, Lucas & Just

[57] ABSTRACT

The invention relates to smelting furnace venturi gas scrubbers of the Warkaus type in which the central nozzle is substituted by three or more nozzles which are arranged along the inner circumference of the venturi tube, in or adjacent its narrowest portion, the mouths of the nozzles being flush with the inner surface of the venturi tube.

5 Claims, 2 Drawing Figures

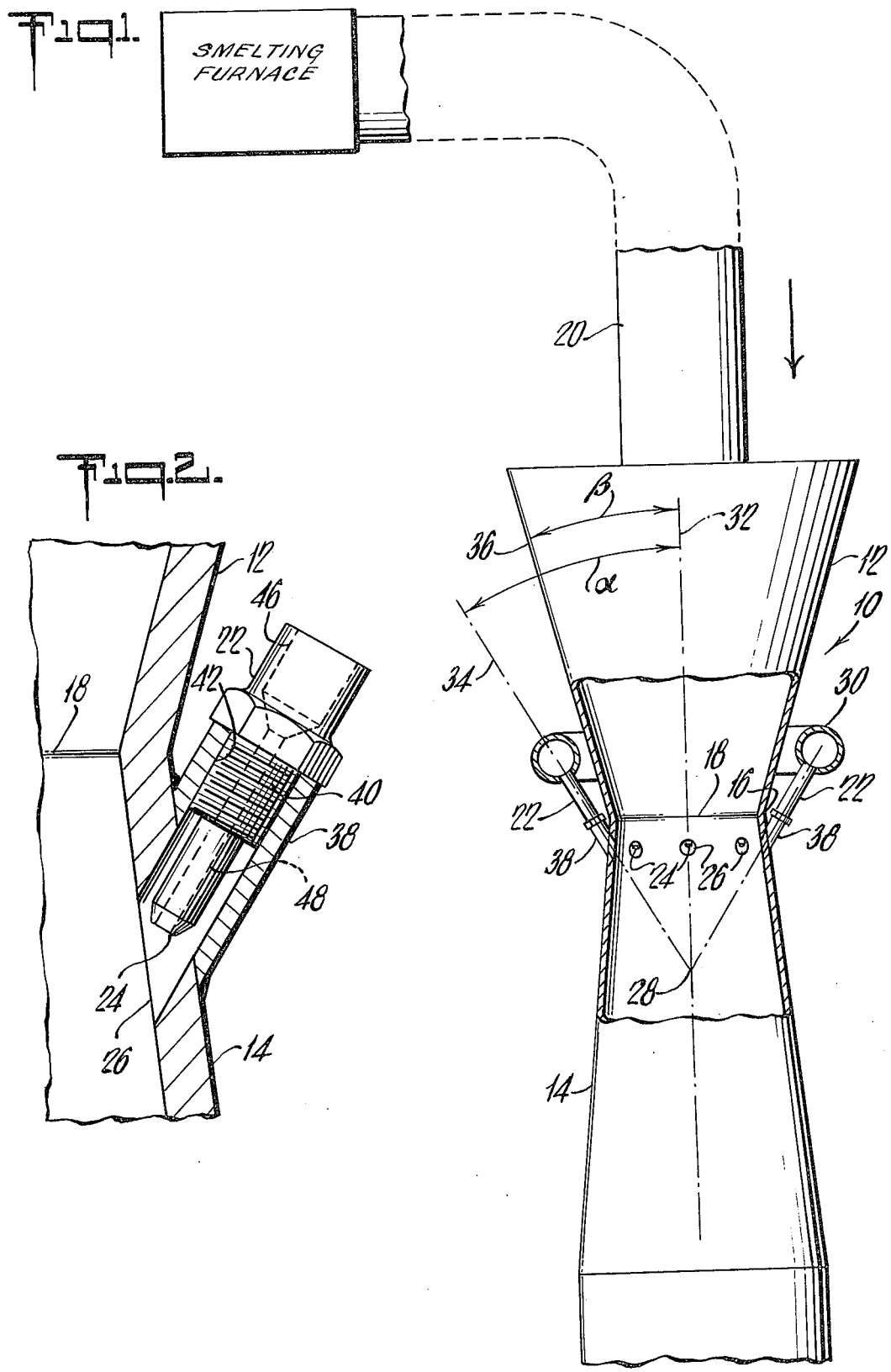

VENTURI GAS SCRUBBERS FOR SMELTING FURNACES

CROSS REFERENCE TO RELATED APPLICATIONS

This is a continuation of application Ser. No. 448,723, filed Mar. 6, 1974 and now abandoned, which was a continuation-in-part of application Ser. No. 216,109, filed Jan. 7, 1972 and now abandoned.

BACKGROUND OF THE INVENTION

1. Field of the Invention

The invention relates to smelting furnace venturi gas scrubbers of the so-called Warkaus-type for use in electric smelting furnaces.

2. Description of the Prior Art

Smelting furnaces used in metallurgical processes give off metallurgical dusts in the flue gases and these dusts must be removed because they are environmental pollutants. They are usually removed by a wet scrubbing system, usually by a number of stages of venturi gas scrubbers. In smelting furnace venturi gas scrubbers, the velocity of the gas to be scrubbed must be high to prevent back-flow and the deleterious effects thereof with respect to clogging. Warkaus-type venturi scrubbers operate on the principle that the energy which is necessary to impart the velocity to the gases to scrub them is supplied by means of the scrubbing fluid. The scrubbing fluid is usually water and in Warkaus-type scrubbers is supplied to the system at relatively high pressure; the pressure may, for instance, be around 25 Kg/cm$^2$ but usually not less than 5 Kg/cm$^2$ for scrubbing gases from electric smelting furnaces. This is in contra-distinction to the venturi scrubbers in which the high gas velocity is achieved using fans or other similar devices.

A smelting furnace Warkaus venturi scrubber consists usually of a number of venturi tubes which operate in series. The separation of the coarser particles in the gases takes place in the first tube while the separation of the finer particles takes place in subsequent tubes. The nozzle through which the scrubbing fluid is supplied is arranged centrally in the narrowest part of the venturi tube in the stream of the gases and the feed pipe through which the scrubbing fluid is conducted to the nozzle is laterally introduced into the tube through its wall. Positioning the nozzle feed pipe in the first venturi tube in the stream of hot unscrubbed gases, which is required to impart the necessary velocity to the gases, results in condensation and deposits on the fluid feed pipe leading to eventual clogging of the system. Surrounding the fluid feed pipe with a steel pipe together with interfacial insulation between the two pipes has been tried. The outer pipe, which terminates above the level of the nozzle, will tend to be at a temperature which is higher than the condensation temperature and this arrangement has improved the conditions to a certain degree. But in those cases where the gas scrubbing plant is operated at reduced load, conditions may occur which cause the scrubbing fluid from the nozzles to have a pulsating motion so that the fluid tends to strike back and moisten the exposed surface of the outer pipe. This will again cause condensation and deposits, leading to eventual clogging of the system. Thus, a conventional Warkaus arrangement in which the scrubbing fluid imparts a high velocity to the gases, even with the aforementioned improvement, does not yield entirely satisfactory results when used as a first stage to scrub gases from a smelting furnace. The Warkaus arrangement is more satisfactory, however, for applications in which there is not a transistion from a dry zone to a wet zone, as for example in subsequent stages of scrubbers for smelting furnaces or in completely wet or completely dry applications.

SUMMARY OF THE INVENTION

The Applicant has now found that the problems of condensation, deposits and clogging in the first stage of Workaus-type smelting furnace venturi scrubbing systems can be substantially avoided by means of a plurality of circumferential nozzles which for best results comprise three or more nozzles arranged in the wall of the venturi tube in or adjacent to its narrowest part. The mouths of the nozzles are preferably arranged flush with the inner surface of the venturi tube to avoid any substantial projection from the inner surface as this would result in the same problems with condensation and deposits as encountered with the central nozzles of Warkaus-type scrubbers. By positioning the nozzles according to the invention, turbulence in the scrubbing fluid running down from the transistion between dry and wet zone is avoided. The direction of the jets of liquid from the nozzles is as steep as possible so that the jets meet in a central spot below the narrowest part of the venturi tube, preferably in the same spot where the earlier central nozzle had its maximum energy. With this arrangement there is no need for a central nozzle.

BRIEF DESCRIPTION OF THE DRAWING

A better understanding of the present invention may be had by reference to the accompanying drawing in which:

FIG. 1 shows a vertical section through the upper part of a venturi tube gas scrubber; and FIG. 2 shows a vertical section in detail of a nozzle according to the invention.

DESCRIPTION OF THE PREFERRED EMBODIMENT

Referring to FIG. 1, a venturi tube 10 is used as a first stage for scrubbing gases from a smelting furnace formed of an upper frustro-conical portion 12, a lower frustro-conical portion 14 and a throat portion 16. 18 is the narrowest part of the tube 10 in the throat portion 16. The unscrubbed hot gases from a smelting furnace enter the system through the pipe 20 in the direction of the arrow at a temperature between approximately 200°C and 1200°C. A plurality of circumferential nozzles 22 are preferably uniformly spaced around tube 10 with an outlet 24 for each nozzle arranged flush with the surface of the inside of the tube. Openings 26 are provided in the tube surface for the nozzle outlets 24. The jets of fluid from these nozzles are directed to meet in a central spot 28 inside the tube below the narrowest part of the throat portion. The manifold 30 supplies the scrubbing fluid to the nozzles. The nozzle outlets 24 may be positioned above or below the narrowest part 18 as long as the nozzles 22 are oriented to inject and direct jets of scrubbing fluid to meet below the narrowest part 18. The angle of inclination of the nozzles 22 is designated by $\alpha$ and is defined by the tube vertical axis 32 and the nozzle axis 34. The value of angle $\alpha$ is determined by several factors. Because the velocity of the gases must be high and the energy required to achieve this is supplied by the jets of scrubbing fluid, the maximum value of angle α is limited by the maximum permissible value of the vertical force component of the fluid jet necessary to achieve the required gas velocity. The minimum value of angle α is limited by the physical structure of the apparatus and is the angle β defined by the tube longitudinal axis 32 and the surface 36 of the upper tube portion 12. The optimum angle α of inclination of nozzles 22 will depend upon the size and contours of tube 10 as well as the characteristics of the gases and scrubbing fluid, as, for example, the composition, volume and introduced velocity of the gases and the volume and pressue of the supplied scrubbing fluid. The maximum permissible value of angle α is 80° and the minimum is 10°, while the preferred value will be from 45° to 60°.

Referring now to FIG. 2, a detail of a nozzle 22 is shown. Since all nozzles are similarly positioned, description of one is deemed sufficient. A tubular receptacle 38 is provided in the wall of tube 10 to receive nozzle 22. Nozzle 22 and receptacle 38 are provided with corresponding threaded portions 40, 42, respectively, so that nozzle 22 may be screwed into receptacle 38 in a fluid-tight manner. The end 24 of nozzle 22 terminates so that no part of the nozzle protrudes past the inner surface of the tube 10. Thus, end 24 may terminate flush with the inner surface of the tube 10 or within the cross-section of tube 10 in opening 26. Nozzle 22 preferably is made up of a feeder chamber 46 and a narrower tubular chamber 48 arranged coaxial therewith, the narrower chamber being provided to give the jets of scrubbing fluid directivity. The exact configuration of nozzles 22 will, therefore, also have an effect on the value of angle α.

As described hereinabove, nozzles 22 are secured in receptacles 38 in a fluid-tight manner. This is necessitated by the fact that approximately 50%–80% of the gases from electric smelting furnaces are carbon monoxide.

The structure has been tested in an industrial scale structure without any occurrence of clogging up while equipment with a central nozzle has to be cleaned approximately once a week. The invention saves labor and maintenance costs and the equipment is simpler and more economical to build than the earlier system with a central nozzle. The invention is of special advantage for utilization in the first cleaning step for scrubbing hot gases from electric smelting furnaces and the like, but it can of course be utilized for any type of fluid to be cleaned and in any scrubbing process in which venturi scrubbers are employed.

It will be understood that various changes and modifications may be made in the preferred form of structure chosen for the purpose of illustration without departing from the spirit and scope of the invention.

What is claimed is:

1. An electric smelting furnace for metallurgical processes and a gas scrubbing system therefor, the first stage of the gas scrubbing system comprising:
   a. a vertically positioned venturi tube scrubber which comprises a venturi tube including upstream and downstream frusto-conical portions and a narrowest portion between the ends thereof;
   b. at least three openings positioned in said venturi tube operative to permit introduction of scrubbing fluid into the interior of the venturi tube;
   c. means for introducing the scrubbing fluid into the interior of the venturi tube comprising at least three circumferentially positioned, elongated tubular nozzles extending at least into said openings, said openings being flush with the walls of the venturi tube and said nozzles not protruding into the interior of the venturi tube;
   d. said nozzles comprising an interior elongated narrower tubular portion and an interior upstream wider portion in communication therewith operative to impart directivity to ejected scrubbing fluid which is introduced under pressure in said wider portion; and
   e. the nozzles being positioned at an acute angle with respect to the vertical axis of the venturi tube and operative to inject and direct jets of scrubbing fluid to meet in a central spot in the interior of the venturi tube downstream from the narrowest part thereof and means to supply the scrubbing fluid at a pressure sufficient so that the requisite velocity of the gases to be scrubbed is imparted substantially by the scrubbing fluid introduced therein.

2. The system according to claim 1 and wherein said acute angle is less than 80°.

3. The system according to claim 1 wherein said acute angle is between 45° and 60°.

4. The system according to claim 1 wherein the means to supply scrubbing fluid under pressure supplies scrubbing fluid at a pressure of at least 5 Kg/cm².

5. The system according to claim 1 wherein receptacle means are provided on said venturi tube to communicate said nozzles with said openings, said nozzles and said receptacles having corresponding threaded portions thereon operative when screwed together to secure said nozzles to said receptacles in a fluid-tight manner.

* * * * *

UNITED STATES PATENT OFFICE
CERTIFICATE OF CORRECTION

PATENT NO. : 3,976,727
DATED : August 24, 1976
INVENTOR(S) : Harald Krogsrud

It is certified that error appears in the above-identified patent and that said Letters Patent are hereby corrected as shown below:

Under Foreign Application Priority Data:

--Jan. 20, 1971 - Norway............195/71-- has been omitted.

Signed and Sealed this

Fourteenth Day of March 1978

[SEAL]

Attest:

RUTH C. MASON
Attesting Officer

LUTRELLE F. PARKER
Acting Commissioner of Patents and Trademarks